United States Patent
Eaton et al.

(10) Patent No.: US 6,825,423 B2
(45) Date of Patent: Nov. 30, 2004

(54) METHOD AND SYSTEM FOR WEIGHING ITEMS SUCH AS MAIL PIECES

(75) Inventors: David J. Eaton, Newtown, CT (US); John E. Massucci, Bronx, NY (US); John P. Miller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 213 days.

(21) Appl. No.: 10/184,158

(22) Filed: Jun. 28, 2002

(65) Prior Publication Data

US 2004/0000436 A1 Jan. 1, 2004

(51) Int. Cl.$^7$ .............................................. G01G 19/414
(52) U.S. Cl. ........................ 177/1; 177/25.15; 702/175; 705/407
(58) Field of Search ................................ 177/1, 16, 17, 177/25.15, 119, 145, 185; 705/407; 702/175

(56) References Cited

U.S. PATENT DOCUMENTS

| | | | |
|---|---|---|---|
| 4,351,033 A | | 9/1982 | Uchimura et al. .......... 364/900 |
| 4,516,209 A | | 5/1985 | Scribner ...................... 364/466 |
| 4,526,244 A | * | 7/1985 | Chauveau ........................ 177/1 |
| 4,529,050 A | * | 7/1985 | Mosher et al. .................. 177/1 |
| 4,709,770 A | * | 12/1987 | Kohashi et al. ................ 177/50 |
| 4,742,878 A | * | 5/1988 | Freeman et al. .......... 177/25.15 |
| 4,787,048 A | * | 11/1988 | Freeman et al. ............. 705/407 |
| 5,119,306 A | | 6/1992 | Metelits et al. ............. 364/464 |
| 5,172,783 A | | 12/1992 | Feinland et al. ............. 177/185 |
| 5,178,228 A | | 1/1993 | Feinland et al. ............. 177/185 |
| 5,226,496 A | * | 7/1993 | Feinland et al. .......... 177/25.15 |
| 5,230,391 A | * | 7/1993 | Murata et al. ................. 177/50 |
| 5,635,679 A | * | 6/1997 | Kohashi et al. ........... 177/25.13 |
| 5,717,166 A | | 2/1998 | Talmadge ................. 177/25.13 |
| 5,723,825 A | | 3/1998 | Dolan et al. ................. 177/145 |
| 5,736,682 A | * | 4/1998 | Heitmann et al. ............. 177/16 |
| 6,433,288 B1 | * | 8/2002 | Olafsson ...................... 177/145 |
| 6,630,632 B2 | * | 10/2003 | Huebler et al. ................. 177/4 |

* cited by examiner

Primary Examiner—Randy W. Gibson
(74) Attorney, Agent, or Firm—Brian A. Lemm; Angelo N. Chaclas (57) ABSTRACT

A weighing system and a postage metering system including such a weighing system. The weighing system includes a transport assembly having a transport for receiving and outputting mail pieces to be weighed and for supporting mail pieces while they are weighed, and a feeder for successively feeding the mail pieces to the transport. A transducer supports the transport and generates and output representative of the load presented by pairs of mail pieces on the transport. After a current item and a previous item are weighed together on the transport, the transport is energized to output the previous item and replace the previous item with the current item, and the feeder is energized to input a next item to the transport as a new current item. The postage metering system computes the weight of the current mail piece as the difference between the weight measured for the current mail piece and the previous mail piece weighed together and the weight of the previous mail piece and determines the appropriate postage in accordance with that weight. The postage metering system prints the previous mail piece with the postage determined for it when it was the current mail piece as it is output. Cumulative error is tracked and when it exceeds predetermined limits a single mail piece is weighed to reinitialize the error accumulation cycle.

20 Claims, 7 Drawing Sheets

METHOD AND SYSTEM FOR WEIGHING ITEMS SUCH AS MAIL PIECES

BACKGROUND OF THE INVENTION

The present invention relates to a system and method for rapid weighing of items. More particularly it relates to scales or weighing systems used in postage metering systems used to weigh and determine postage for mail pieces or the like.

Postal scale systems are well known. Such scale systems weigh a mail piece and determine the appropriate postage for that mail piece as a function of the weight. Postal mailing systems where a mail piece is transported onto a postage scale system, the appropriate postage is determined, and the mail piece is then transported to postage metering system for imprinting with a postal indicium representative of the postage determined are also known. One such system is described in U.S. Pat. No. 4,742,878; issued May 10, 1988. In such systems there is a constant need to increase the rate at which the scale can determine the weight of a mail piece in order that the throughput of the system can be increased.

U.S. Pat. No. 4,787,048; issued: Nov. 22, 1988, discloses one approach to decreasing the time required for a postage scale system to determine the weight of a mail piece. The system disclosed in this patent takes advantage of the structure of postage rate charts, i.e., the function that relates the weight of the mail piece to the appropriate postage amount. Such rate charts provide a constant postage value for all weights between a pair of predetermined weight breaks. The system of the '048 patent takes advantage of this by use of an algorithm where a first estimate of the weight is made and used to determine the postage amount unless the first estimate is within a predetermined distance of a break point, in which case a second more accurate estimate is made.

While such systems have proven to be highly satisfactory for their intended purpose a basic problem remains that the weight of each mail piece in batches of mixed weight mail must be determined and the corresponding postage amount calculated before the vault (i.e. secure accounting registers which track postage expended by the meter to assure that the postal service receives payment for all mail pieces metered) can be debited for the postage amount and an appropriate indicium generated.

Thus it is an object of the present invention to provide a method and system for increasing the rate at which items such as mail pieces can be weighed and the time available to generate indicia and account for postage expended.

BRIEF SUMMARY OF THE INVENTION

The above object is achieved and the disadvantages of the prior art are overcome in accordance with the present invention by a method and system including a transport assembly, the transport assembly having a transport for receiving and outputting mail pieces to be weighed, and for supporting the mail pieces during weighing and a feeder for successively feeding the mail pieces to the transport. A transducer mechanism supports the transport and generates an output representative of the load presented by the transport, from which the weight of mail pieces on the transport can be determined. In accordance with the method of the present invention a controller controls operation of the postage metering system so that after weighing of a current mail piece and a previous mail piece together, the transport is energized to advance the current mail piece and the previous mail piece, and a weight MW for the current mail piece is determined as the difference between a total weight TW on the transport and a weight PW for the previous mail piece. The feeder is then energized to input a next mail piece to the transport, and the transport is stopped so that the next mail piece and the current mail piece are supported by the transport for weighing together and the previous mail piece is output.

In accordance with one aspect of the present invention the controller generates an estimate, CE, of cumulative weighing error for the current mail piece as a function of a number of mail pieces weighed in a cycle of error accumulation and, if CE exceeds a predetermined limit, subsequently weighs a single mail piece separately to reinitialize the cycle of error accumulation.

In accordance with another aspect of the present invention the cycle is reinitialized if a weight interval, (MW−CE, MW+CE), intersects a weight interval (BP−O, BP+O), where BP is a rate break point in a predetermined postal rate schedule, and O is a predetermined offset.

In accordance with another aspect of the present invention CE is computed as $(n+1)*E$, where n+1 is the number of mail pieces weighed in the cycle of error accumulation and E is a maximum error in weighing one of the mail pieces.

In accordance with still another aspect of the present invention CE is computed as $\alpha\sigma_e(n+1)^{1/2}$, where n+1 is the number of mail pieces weighed in the cycle of error accumulation, $\sigma_e$ is a standard deviation of error e in weighing one of the mail pieces, and $\alpha$ is a predetermined constant.

In accordance with still another aspect of the present invention the mail pieces are printed with a postal indicium as they are transported by the transport.

In accordance with still another aspect of the present invention the controller generates a signal representative of a position of the transport for synchronizing printing of the indicium with movement of the mail piece.

In accordance with still another aspect of the present invention a print registration plate for aligning the mail pieces during printing is mounted on the transport.

Other objects and advantages of the present invention will be apparent to those skilled in the art from consideration of the detailed description set forth below and the attached drawings.

DETAILED DESCRIPTION OF PREFERRED EMBODIMENTS OF THE INVENTION

Figure 1:
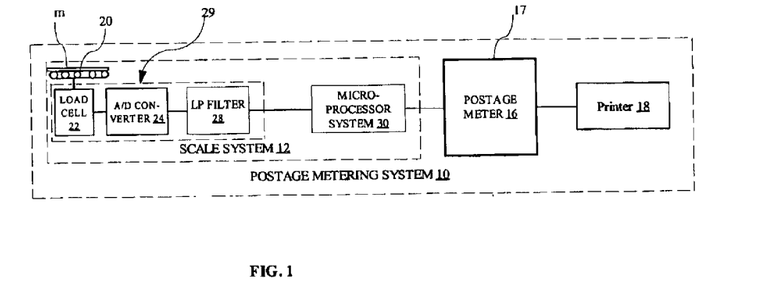
FIG. 1 shows a schematic diagram of a postage metering system in accordance with the present invention.

FIG. 1 shows postage metering system 10, which includes scale system 12, postage meter 16 and printer 18. As is well known in the art, meter 16 is enclosed in secure housing 17 to prevent tampering. Scale system 12 includes transport assembly 20, which supports a mail piece during a weighing operation and then transports the mail piece to printer 18 for printing with a postal indicium; load cell 22, which supports transport assembly 20 and which generates an analog output representative of the instantaneous load it supports; analog-to-digital converter 24, which converts the output of load cell 22 to digital form; and low pass digital filter 28, which processes the output of converter 24 to reduce or eliminate the effects of vibrations. Microprocessor system 30 provides programmable controller 30c (shown in FIG. 2) for scale system 12, as will be described further below.

Together load cell 22, converter 24 and filter 28 comprise transducer mechanism 29, which generates a digital weight signal (i.e. a time series of digital values) representative of the instantaneous load supported by cell 22. Other types of transducer mechanisms are known, or may be developed in the future, and details of the operation of particular transducer mechanisms used form no part of the present invention.

Microprocessor system 30 receives the weight signal from transducer mechanism 29 and processes it to determine a weight for the current mail piece in process. It then accesses postal rate charts (not shown) to determine a postage amount for the current mail piece as a function of the mail piece weight, and possibly as a function of other mail piece data such as class of service or special services requested for the mail piece. Typically such rate charts will be updated periodically in any convenient manner as postal services change their rates.

Except as will be described further below with regard to the present invention, operation of such postage metering systems is well known and need not be described further here for an understanding of the present invention.

Figure 2:
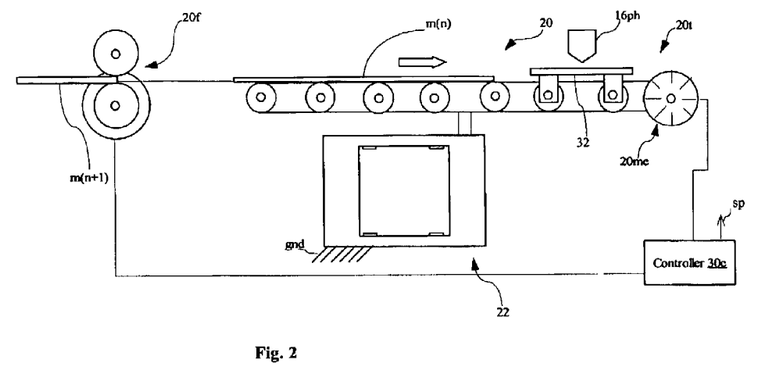
FIG. 2 shows a more detailed schematic diagram of a transport assembly and load of FIG. 1.

FIG. 2 shows a more detailed schematic representation of transport assembly 20 supported with respect to mechanical ground gnd by load cell 22. Transport assembly 20 includes transport 20, which is driven by motor/encoder assembly 20me and feeder 20f. Transport 20t and feeder 20f are controlled separately by controller 30c so that transport 20 receives a sequence of mail pieces m (n), m(n+1) ... from feeder 20f, supports the mail pieces during weighing, and transports them for output. As mail pieces are transported past print head 16ph of postage meter 16 they are printed with an indicium in a manner well known to those skilled in the art.

In accordance with the present invention, print registration plate 32 is mounted to transport 20t to form part of the tare. As is known in the art mailpieces are pressed upwards against plate 32 to register the upper surface during printing.

Motor encoder assembly 20me also provides a feedback signal to controller 30c, which in turn generates signal sp representative of the position of the transport 20t which is used to synchronize printing of the mailpieces during acceleration of transport 20t, as will be described further below.

Figure 3:
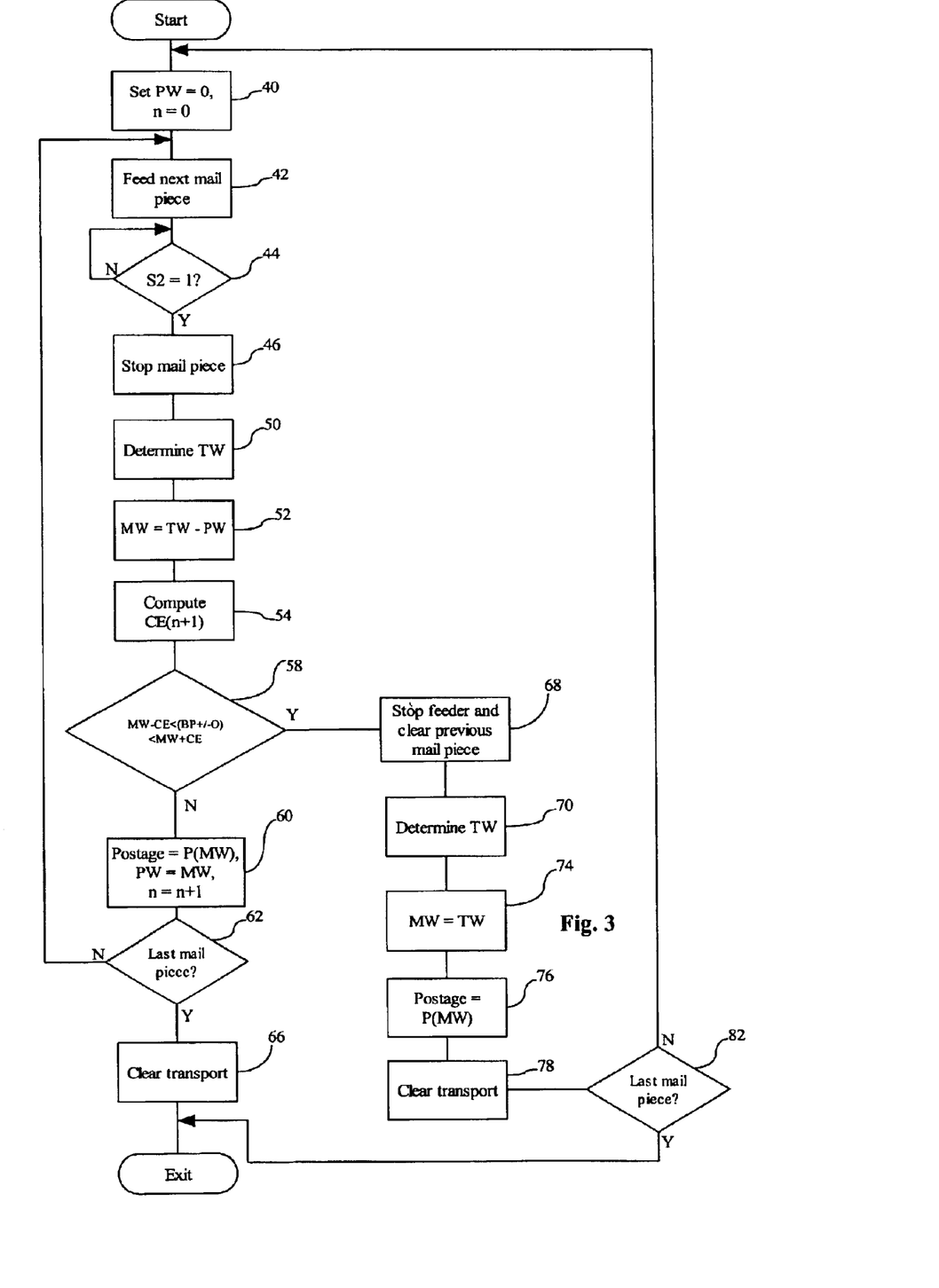
FIG. 3 shows a flow diagram of the operation of the postage meter of FIG. 1 in accordance with the present invention.
Figure 4A:
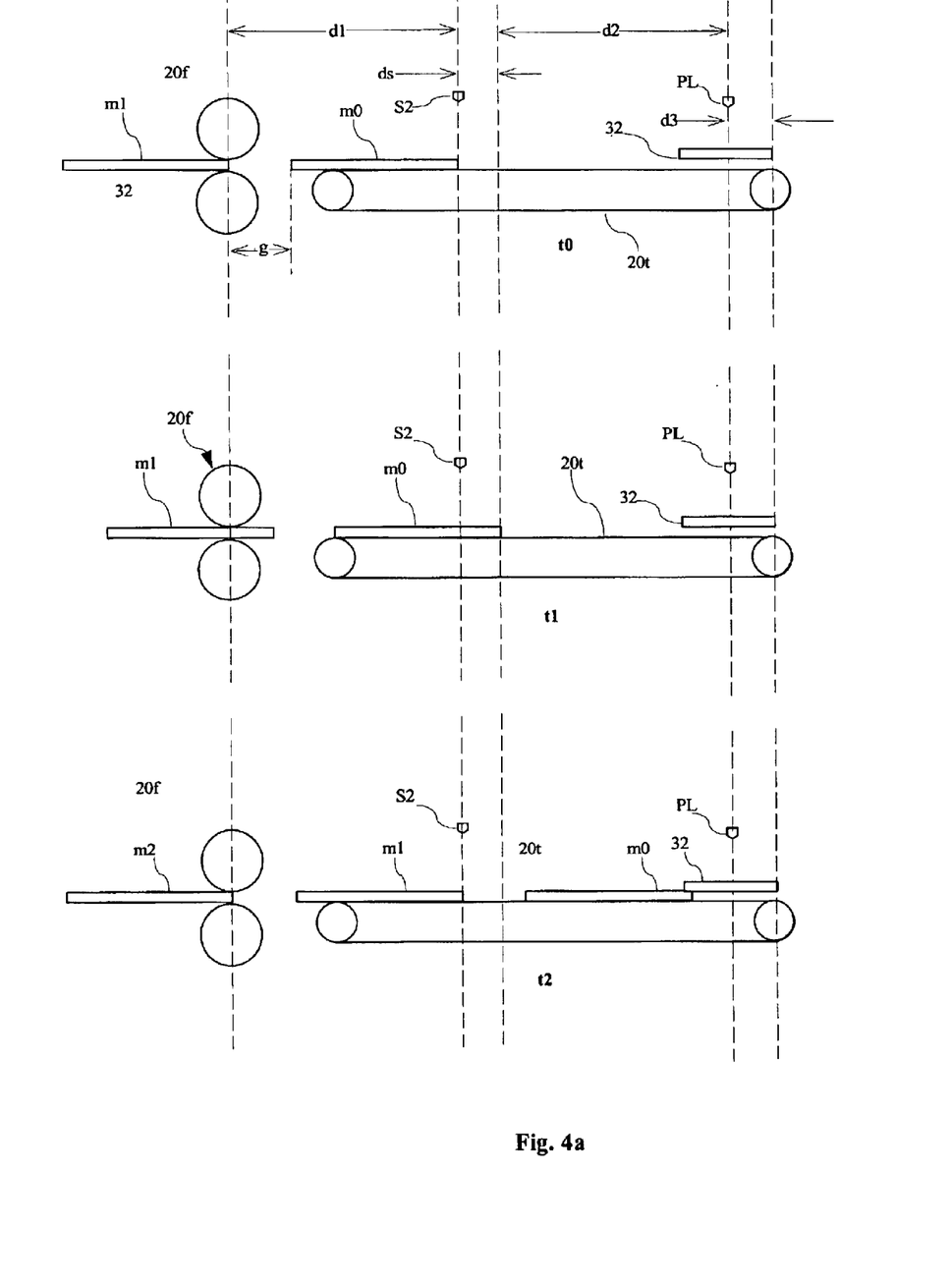
FIGS. 4a and 4b show a schematic diagram of a weighing cycle in accordance with the present invention.
Figure 4B:
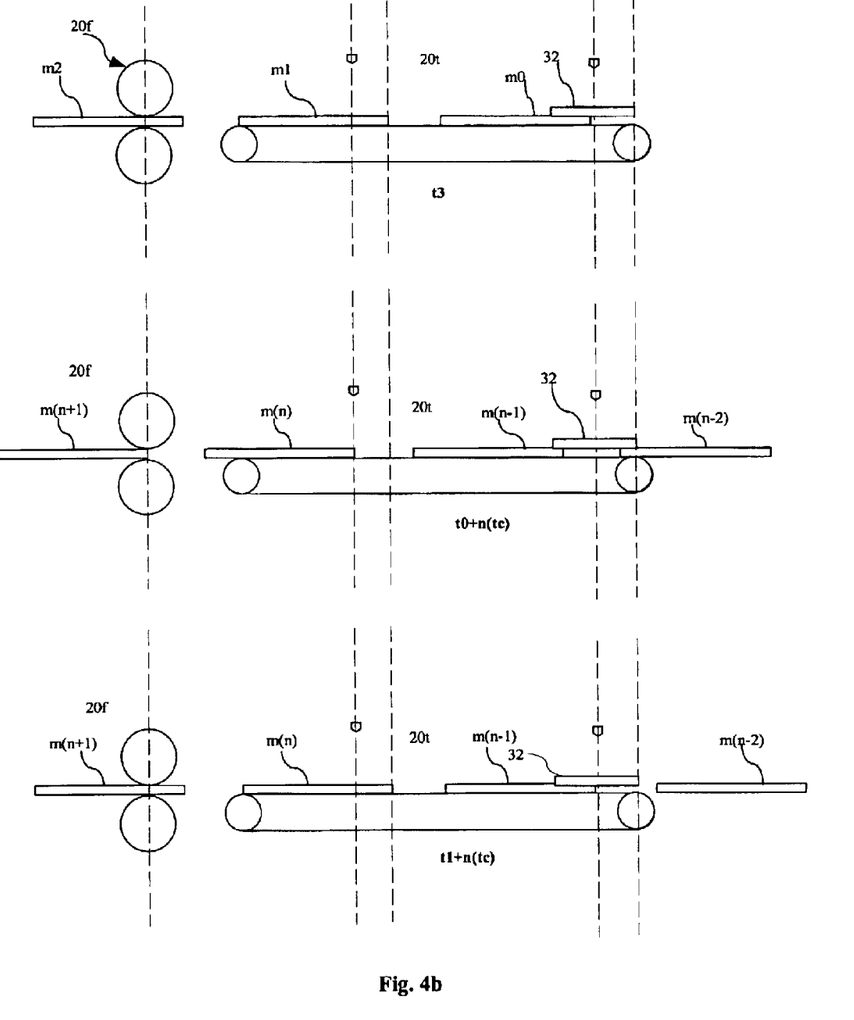

FIG. 3 and FIGS. 4a and 4b together illustrate the operation of a postage metering system in weighing mail pieces in accordance of the present invention. At step 40 controller 30c sets previous weight PW and count n equal to 0. Count n represents the number of mail pieces weighed in the current cycle of error accumulation. At step 42 controller 30c controls feeder 20f to feed the next mail piece. At step 44 controller 30c waits for a signal from sensor S2. When a signal from a sensor S2 is received the state of the weighing cycle for first mail piece m0 is as shown in FIG. 4a at time t0. The leading edge of first, and current, mail piece m0 is at S2 and the leading edge of next mailpiece m1 is at the exit of feeder 20f, located a distance d1 downstream from sensor S2. Mail pieces are separated by gap g.

At step 46 controller 30c decelerates mailpieces m0 and m1 so that they are stopped in a distance ds. When transport 20t and feeder 20f are stopped, the state of the weighing cycle is as shown in FIG. 4a at time t1. At time t1 mail piece m0 is weighed in a conventional manner at step 50 to determine total weight TW. (Those skilled in the art will recognize that time tw, required to determine total weight TW, and thus cycle time tc, varies from mail piece to mail piece.) Then, at step 52 controller 30 (shown in FIG. 1) sets the weight of the current mail piece MW equal to TW−PW. Then, at step 54, controller 30 computes cumulative error CE (n+1) as a function of the number of mail pieces that have been weighed in the current cycle of error accumulation. At step 58 controller 30 determines if error CE exceeds predetermined limits, as will be described further below. If error CE is within limits then, at step 60, controller 30 determines postage for mail piece m0 as a function of current weight MW, sets PW=MW, and sets n=n+1. Then, at step 62, controller 30c determines, in a conventional manner, if mail piece m0 is the last mail piece, i.e. if there are any more mail pieces in feeder f. If so, at step 66 controller 30c clears all mail pieces from transport 20t and exits. Otherwise controller 30c returns to step 42. When controller 30c again reaches step 46 the state of the weighing cycle will be as shown at time t2 in FIG. 4a. Mail piece m1 has reached S2 and it is apparent that the difference t2−t0 represents a weight cycle time. When mail piece m1 is stopped, as shown at time t3, in FIG. 4b, controller 30c proceeds through steps 50 through 62 to determine current weight MW for mail piece m1 and corresponding postage P(MW), as described above. Note that PW is equal to the weight of the mail piece m0 determined in the previous weighing cycle and that n is now equal to n+1.

Inspection of time t3 for FIG. 4b shows that, were print registration plate 32 not part of the tare, plate 32 would exert a force on mail piece m0 that would invalidate the weight measured for mail piece m1.

Thereafter, successive weighing cycles begin at times t0+n(tc) and weighing of current mail piece m(n) will occur at times t1+n(tc), where tc is the weigh cycle time as shown in FIG. 4b. As can be seen at time t1 +n(tc) mail piece m(n) is the current mail piece, weight PW is the weight of mail piece m(n−1) which is stopped just before print line sensor PL and next mail piece m(n+1) is stopped in feeder 20f. Mail piece m(n−2) has been output.

It will be apparent to those skilled in the art that printing of mail piece is initiated as the leading edges pass sensor, PL which signals controller 30 (shown in FIG. 1) to control print head 16ph to print an indicium representative of an appropriate postage amount on the mail piece in a manner well known to those skilled in the art. Note that it is expected that for typical geometries that mail pieces will be accelerating for at least part of the printing process and that signal sp is accordingly provided by controller 30c to synchronize printing of such accelerating mail pieces.

It will be apparent from the above description, that a particular advantage of the present invention is that the full cycle time tc is available for a generation of an indicium. This is a particular advantage for modern postage meters that use digital printing technologies and incorporate encryption, and require substantial time to generate an indicium.

Figure 5:
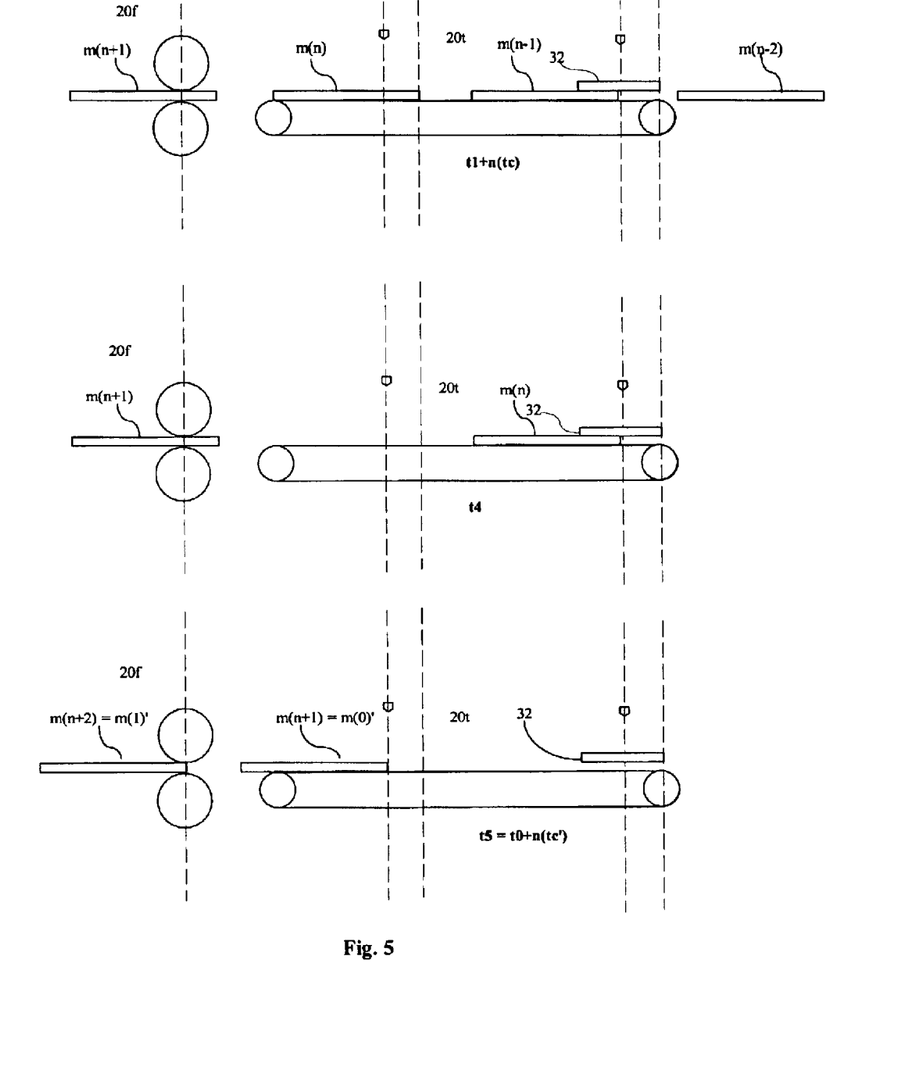
FIG. 5 shows a schematic diagram of reinitializing an error accumulation cycle in accordance with the present invention.

FIG. 5 illustrates the operation of the present invention in reinitializing the cycle of error accumulation when the cumulative error CE exceeds a predetermined limit. In FIG. 3 if, at step 58, weight interval (MW−CE, MW+CE) intersects weight interval (BP−O, BP+O), where BP is any weight break in the postal rate chart in use and O is a small offset value, controller 30c goes to step 68. The state of the weighing cycle is shown in FIG. 5 at time t1 +n(tc). Mail pieces m(n) and m(n−1) are stopped on transport 20t with mail piece m(n−1) positioned just before sensor PL. Next mail piece m(n+1) is in feeder 20f and mail piece m(n−2) has been output. At step 68 controller 30c starts transport 20t while stopping feeder 20f to print and output mail piece m(n−1), which has been previously acceptably weighed, is printed and output as described above, and then stops so that mail piece m(n) is the only mail piece on transport 20t, as shown in FIG. 5 at time t4.

Then at step 70 controller 30 determines total weight TW, then sets the current weight for mail piece m(n) MW=TW and then at step 76 determines postage P(MW). At step 78, mail piece m(n) is output and printed, as described above, and at step 82, controller 30c determines if this is the last mail piece. If so, controller 30c exits. If mail pieces remain, controller 30c returns to step 40 to reinitialize the error accumulation cycle as shown in FIG. 5 at time t5.

At step 58 cumulative error CE may be determined in different ways for different embodiments of the present invention. In one embodiment of the present invention CE=(n+1)e, where e is the maximum error in a measurement. Thus, if the weight interval (MW−CE, MW+CE) intersects a breakpoint weight interval (BP−O, BP+O) in a rate chart, the cumulative error CE is considered to have exceeded acceptable limits. In other embodiments error CE can be determined statistically as $\alpha \sigma_e (n+1)^{1/2}$, where $\alpha$ is a predetermined constant and $\sigma_e$ is the standard deviation of the error in a single weight measurement.

Values for offset O are chosen to reduce the likelihood that CE will exceed acceptable limits and invalidate a mail piece weight before cumulative error CE is reinitialized. Values for offset O suitable for various applications can be determined readily by experimentation.

In other embodiments of the present invention, rather than reweighing the current mail piece m(n) either the measured weight can be assumed acceptable, or the higher of the two possible weights can be accepted, and the current mail piece m(n) output and printed, as described above, while feeder 20f is stopped, and the error accumulation cycle reinitialized, and feeder 20f is then restarted to bring next mail piece m(n+1) to S2, essentially as shown in FIG. 4a at time t0.

Figure 6:
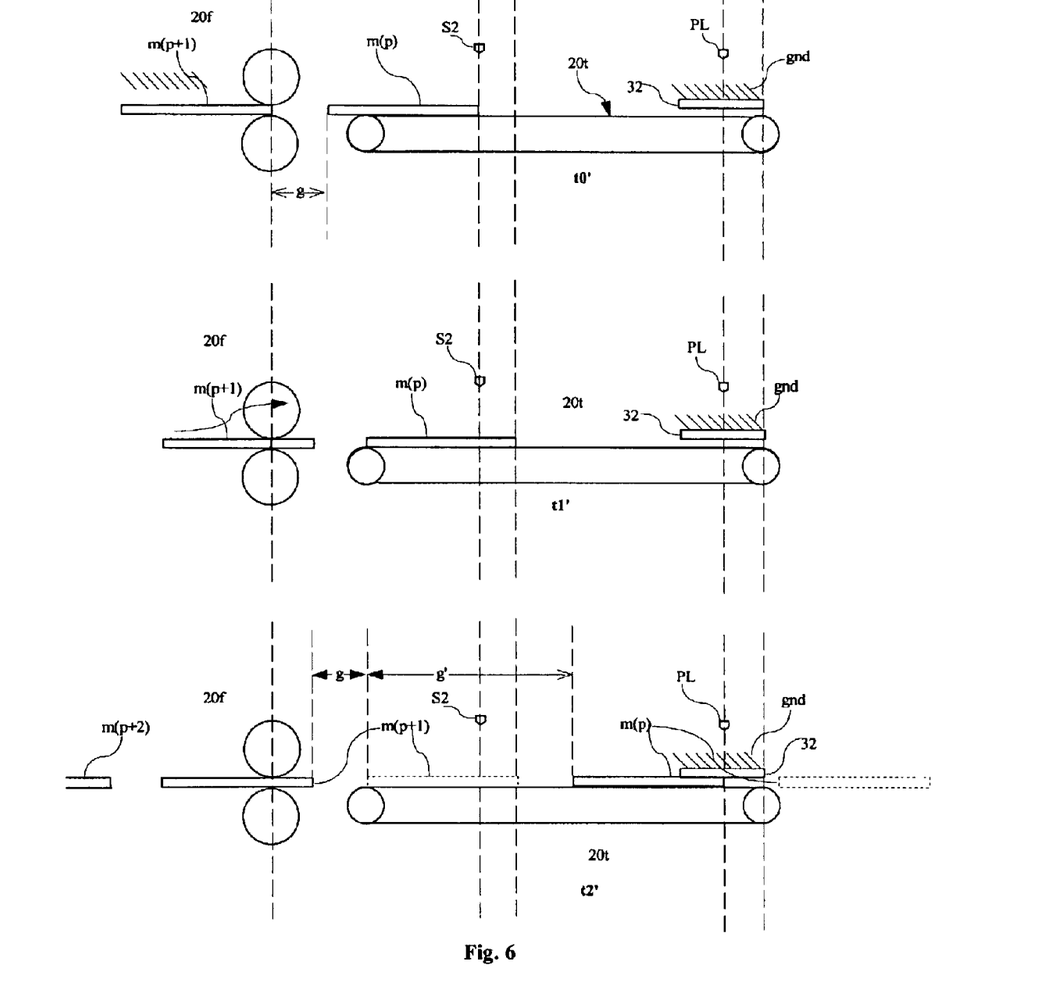
FIG. 6 shows a schematic diagram of a single mail piece weighing cycle.

FIG. 6 shows the operation of a metering system substantially similar to that described above in weighing mail pieces a single piece at a time for purposes of comparison. At time t0' mail piece m(p) is at S2 and mail piece m(p+1) is at the output of feeder 20f. At time t1' transport 20t is stopped with mail piece m(p) positioned for weighing as described above and feeder 20f is stopped. After weighing and termination of postage, transport 20t is restarted and mail piece m(p) is output and printed as described above. Feeder 20f is not restarted until time t2' when the gap between mail pieces is increased by an amount g'. Thus when mail piece m(p+1) is in position for weighing (shown in phantom), mail piece m(p) (shown in phantom) will be clear of transport t and mail piece m(p+1) will be weighed separately. Thus the start of the next weighing cycle is delayed, and weight cycle time tc' increased, by the amount of time required to increase the gap by amount g'. It should also be noted that attempts to reduce this time would equally reduce the time available to generate the indicium on mail piece m(p).

EXAMPLE

Assuming in FIG. 4a:

d1=11.083 inches d2=11.140 inches d3=1.5 inches mail pieces accelerate to and decelerate from an operating speed of 50 inches/sec mail piece acceleration=768 inches/sec/sec mail piece deceleration=1229 inches/sec/sec then:

ds=approx. 1 inch t1−t0=approx. 40 msec t2−t1=approx. 235 msec+tw, and tc=275 msec+tw; where tw is the time to determine the weight after stopping transport t.

Assuming the same values for single piece weighing in FIG. 6 and, for convenience, that g'=d2 (The actual increase g' can be determined in any convenient manner so long as it is great enough to allow the previous mail piece to clear the transport before the next mail piece is weighed.):

t1'−t0'=approx. 40 msec delay, t2'−t1', to increase gap by g'=approx. 255 msec tc'=approx. 275 msec+tw+255 msec.

Those skilled in the art will recognize that other factors; including the ability to use faster weighing algorithms to reduce time tw, and the need to reinitialize cumulative error CE from time to time, will reduce the advantage of the present invention. It should also be noted that, for simplicity, the above comparison has assumed that all factors other than the delay before feeding the next mail piece are the same. Actual devices that weigh single mail pieces will also use a slightly different and more optimal geometry. One such device marketed by the assignee of the present application has a cycle time of approximately 433 mse.+tw. Nevertheless it is apparent that, for certain embodiments at least, substantial decreases in weight cycle time tc can be achieved. Also, as previously noted, the time available to generate an indicium is increased from 190 msec to 235 msec+tw.

Note, that for single piece weighing, plate 32 can be fixed to ground gnd since no mail piece is present during weighing to couple forces to transport t.

The embodiments described above and illustrated in the attached drawings have been given by way of example and illustration only. From the teachings of the present application those skilled in the art will readily recognize numerous other embodiments in accordance with the subject invention. Particularly other modifications of various indicia printed with different geometries will be apparent. Accordingly, limitations on the present invention are to be found only in the claims set forth below.

What is claimed is:

1. A weighing system comprising:

a) a transport assembly, said transport assembly comprising:

a1) a transport for receiving and outputting items to be weighed, and for supporting said items during weighing;

a2) a feeder for successively feeding said items to said transport;

b) a transducer mechanism supporting said transport and generating an output representative of the load presented by said transport, whereby the weight of items on said transport can be determined; and c) means for controlling the operation of said transport assembly, said means for controlling including means for weighing a current item and a previous item together, energizing said transport to advance said current item and said previous item, energizing said feeder to input a next item to said transport, and stopping said transport so that said next item and said current item are supported by said transport for weighing together.

2. A weighing system as described in claim 1 where said items are mail pieces, which are printed with a postal indicium as they are transported by said transport.

3. A weighing system as described in claim 2 where said means for controlling further includes means for providing a position signal representative of a position of said transport for synchronizing printing of said indicium with movement of said mail piece.

4. A weighing system as described in claim 2 where a print registration plate for aligning said mail pieces during printing forms part of a tare of said weighing system.

5. A postage metering system comprising:
a) a transport assembly, said transport assembly comprising:
   a1) a transport for receiving and outputting mail pieces to be weighed, and for supporting said mail pieces during weighing;
   a2) a feeder for successively feeding said mail pieces to said transport;
b) a transducer mechanism supporting said transport and generating an output representative of the load presented by said transport, whereby the weight of mail pieces on said transport can be determined;
c) means for controlling the operation of said postage metering system, said means for controlling including means for weighing a current mail piece and a previous mail piece together, energizing said transport to advance said current mail piece and said previous mail piece, determining a weight MW for said current mail piece as the difference between a total weight TW on said transport and a weight PW for said previous mail piece, energizing said feeder to input a next mail piece to said transport, and stopping said transport so that said next mail piece and said current mail piece are supported by said transport for weighing together.

6. A postage metering system as described in claim 5 where said means for controlling further includes means for generating an estimate CE of cumulative weighing error for said current mail piece as a function of a number of mail pieces weighed in a cycle of error accumulation and, if CE exceeds a predetermined limit, subsequently weighing a single mail piece separately to reinitialize said cycle of error accumulation.

7. A postage metering system as described in claim 6 where said cycle is reinitialized if a weight interval, (MW−CE, MW+CE), intersects a weight interval (BP−O, BP+O), where BP is a rate break point in a predetermined postal rate schedule, and O is a predetermined offset.

8. A postage metering system as described in claim 7 where CE is computed as $(n+1)*E$, where n+1 is said number of mail pieces weighed in said cycle of error accumulation and E is a maximum error in weighing one of said mail pieces.

9. A postage metering system as described in claim 7 where CE is computed as $\alpha\sigma_e(n+1)^{1/2}$, where n+1 is said number of mail pieces weighed in said cycle of error accumulation, $\sigma_e$ is a standard deviation of error e in weighing one of said mail pieces, and $\alpha$ is a predetermined constant.

10. A postage metering system as described in claim 5 where said mail pieces are printed with a postal indicium as they are transported by said transport.

11. A postage metering system as described in claim 10 where said means for controlling further includes means for providing a signal representative of a position of said transport for synchronizing printing of said indicium with movement of said mail piece.

12. A postage metering system as described in claim 10 where a print registration plate for aligning said mail pieces during printing is mounted on said transport.

13. A method for weighing items in a sequence of items, said method comprising the steps of:
a) weighing a current item and previous item having a known weight PW together to determine a total weight TW;
b) determining a weight MW for said current item as TW−PW;
c) replacing said previous item with said current item and setting PW=MW;
d) replacing said current item with a next item in said sequence; and
e) returning to step a.

14. A method as described in claim 13 further comprising the steps of:
a) generating an estimate CE of cumulative weighing error for said current item as a function of a number of items weighed in a cycle of error accumulation; and
b) if CE exceeds a predetermined limit, subsequently weighing a single item separately to reinitialize said cycle of error accumulation.

15. A method as described in claim 14 where said items are mail pieces and said cycle is reinitialized if a weight interval, (MW−CE, MW+CE), includes a weight interval (BP−O, BP+O), where BP is a rate break point in a predetermined postal rate schedule, and O is a predetermined offset.

16. A method as described in claim 15 where CE is computed as $(n+1)*E$, where n+1 is said number of mail pieces weighed in said cycle of error accumulation and E is a maximum error in weighing one of said mail pieces.

17. A method as described in claim 15 where CE is computed as $\alpha\sigma_e(n+1)^{1/2}$, where n+1 is said number of mail pieces weighed in said cycle of error accumulation and $\sigma_e$ is a standard deviation of error e in weighing one of said mail pieces, and $\alpha$ is a predetermined constant.

18. A method as described in claim 14 where CE is computed as $(n+1)*E$, where n+1 is said number of items weighed in said cycle of error accumulation and E is a maximum error in weighing one of said items.

19. A method as described in claim 14 where CE is computed as $\alpha\sigma_e(n+1)^{1/2}$, where n+1 is said number of items weighed in said cycle of error accumulation, $\sigma_e$ is a standard deviation of error e in weighing one of said items, and $\alpha$ is a predetermined constant.

20. A method as described in claim 14 where said items are mail pieces.

* * * * *